June 24, 1930.  R. E. REARDON  1,768,148
SAFE HEAT COOKING UTENSIL
Filed Nov. 1, 1928

INVENTOR
Robert Edwin Reardon

Patented June 24, 1930

1,768,148

UNITED STATES PATENT OFFICE

ROBERT EDWIN REARDON, OF COLUMBIA, PENNSYLVANIA

SAFE HEAT COOKING UTENSIL

Application filed November 1, 1928. Serial No. 316,477.

My invention relates to improvements in safe heating cooking utensils of the domestic double boiler type and its object is to provide a similar utensil which dispenses with the use of water as a heat transmitting and controlling medium, and substitute therefor air guarded from flame and thermostatically controlled in temperature to an indicated heat, thus dispensing with the constant attention necessary to prevent water drying out and consequent loss through burning of the container and food which is incidental to the use of a water jacketed cooker, I attain the object of my invention by the construction, combination and arrangement of parts hereinafter described and particularly pointed out in the claims, it being understood that I do not limit myself to the details of construction or combination of parts as shown herein.

My invention is illustrated in the accompanying drawings in which.

In the drawings like numerals indicate similar parts.

Figure 1:
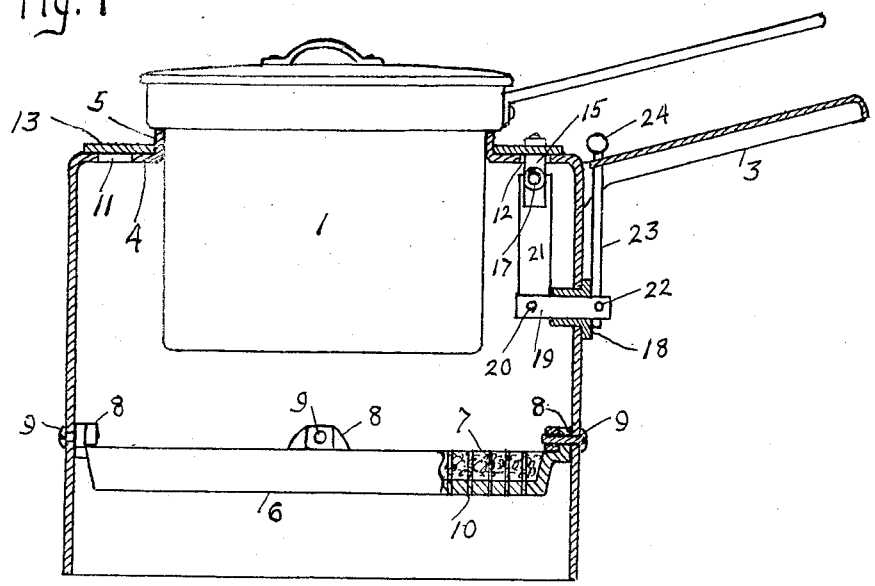
Fig. 1 is a side view of my cooker with the base shown in vertical half section, the parts being in normal position.
Figure 2:
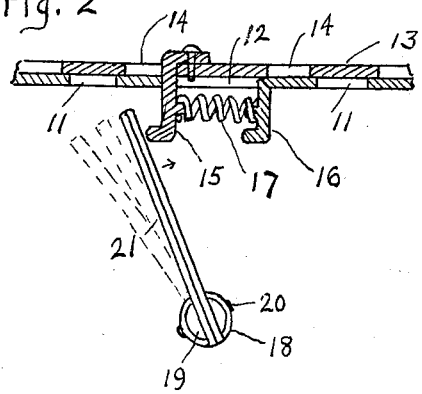
Fig. 2 illustrates the slide damper and thermostat relation thereto, the damper and base top shown in horizontal half section as from inner side.
Figure 3:
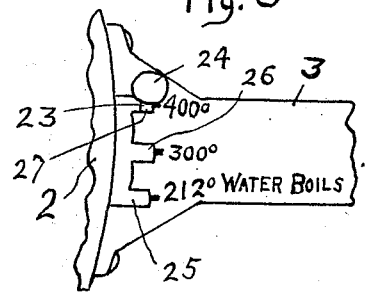
Fig. 3 is a partial view of the base handle from above at its junction with the base, showing head of thermostat adjusting spring lever and heat scale notches therefor.

My safety cooker may be made as are the usual cooking utensils for similar use, of die formed sheet metal parts, the base being preferably of stainless steel. It could if desirable be made of moulded metal largely. The cooker consists of an upper, handled, food containing vessel 1, the same as ordinarily used in domestic double boilers, and a lower support or base cylinder 2, adapted when assembled to form a hot air pocket or chamber around the upper vessel as it sets therein, and divert flame from contact with same. This lower section 2 takes the place of the usual water bath base and is exteriorly approximately of the same size and shape. The base section 2 is in effect a short cylinder of sheet metal with a handle 3 thereon and its top peripheral wall turned inward horizontally as a flange 4 which forms a partial top enclosure with a short inner marginal neck projection 5, adapted to encircle and support the upper vessel or container, 1, centrally in the head of the said base cylinder 2. Inside of the base cylinder 2 at a suitable distance above the bottom rim of same is secured horizontally a fire screen plate, preferably of heavy metal, 6, dished centrally of its upper side to hold a thick disk of asbestos 7 and held with its margin narrowly spaced from the inner wall of the cylinder by lateral lug projections and bolts, as 8 and 9, by which the screen plate 6 is detachably bolted to the cylinder wall and held in place centrally of the cylinder diameter. The said screen plate 6 and asbestos disk 7 may be pierced by a number of vertical apertures, as 10, sufficiently small to prevent the passage of flame therethrough, while allowing ascent of heated air or gases. The top flange 4 of the base cylinder 2 is flat and apertured at intervals around its circumference, with one longer aperture for a sliding stud, as 11 and 12, respectively, and adapted to form a runway for a flat circular ring or damper slide 13 which is correspondingly apertured at intervals, as 14, and has a downwardly projected stud 15. This damper slide ring 13 is adapted to lie on the said runway flange 4, around the neck 5 thereon, normally covering the apertures, as 11, therein and having its stud 15 extended downward through aperture 12 into the cylinder interior. In the runway flange 4 at one end of aperture 12 is pressed down vertically into the cylinder interior a tongue of metal 16 which faces the said slide stud 15 and is spaced therefrom by the length of slide aperture 12 when the slide 13 is in normal position. Between the stud 15 and tongue 16 is mounted a compression coil spring 17 the tension of which holds slide 13 in said normal place. Below the location of the said slide stud 15, at a suitable distance therefrom, there is extended horizontally into the interior of base cylinder 2 through the side wall thereof a hollow stud 18, mounted in which and projecting interiorly beyond same is a pin 19. In the slotted inner end of the pin 19 is secured at right angle thereto, by a suitable cross-pin 20, a strip of thermostatic metal 21, mounted to extend upwardly and contact with slide stud 15 on the side opposite spring 17 and bend against said slide stud when heated. In the outer head of the pin 19, outside the cylinder base wall, is secured, by hole and cross-pin 22, at similar right angle to said pin 19 as the thermostatic strip 21, a spring lever arm 23 with a ball head 24, mounted to extend upward through the forked end of handle 3 at its junction with the wall of the base cylinder 2, and engage one of several notches, as 25, formed in the body of handle 3 thereat, facing the base cylinder wall and spaced therefrom at a distance to allow passage of spring lever arm 23 from one notch to another. These notches, as 25, 26 and 27, form a heat scale, say of water boiling temperature, 212 degrees Fahrenheit, and 300 and 400 degrees, and are sufficiently spaced from each other laterally to enable the spring lever arm 23 when set in one to hold the thermostatic metal strip turned far enough away from slide stud 15 to defer operative contact with same until the indicated temperature has been reached in the base cylinder air chamber.

In operation my safe heat cooker is used largely as is the ordinary domestic double boiler. The upper section or container is placed in the lower section or base cylinder, which in this case has its thermostat spring lever 23 set, by finger pressure against its ball head 24, in scale notch 25 for boiling water temperature. The cooker being placed over a fire, preferably a gas flame, the flame is confined to the base space beneath the fire screen plate 6 and the heated air ascends through the flame baffling openings in and about same and fills the hot air chamber or pocket above the screen plate in which the container 1 sets. The hot air chamber being completely closed overhead by the damper slide 13 and flame closed below, the heat in the air chamber rises in accordance with the intensity of the fire until the temperature of boiling water is attained. At this point the strip of thermostatic metal 21 begins to bend against the stud 15 of the damper slide 13, against the pressure of spring 17 which holds it normally closed, and presses the damper slide around on its runway, the top flange 4 of the base cylinder 2, until the apertures therein, as 11, are uncovered, thus allowing excessively heated air to escape until the air chamber temperature has been sufficiently lowered. The damper slide 13 then closes the vent apertures by returning to normal position through pressure of spring 17 against stud 15 and runway tongue 16. This action is repeated as heat may vary during the cooking process.

It will be obvious that even if the thermostatically operated vent is dispensed with and the air chamber of the cooker allowed to remain closed except at bottom, the cooker may be satisfactorily operated over a suitably low fire. The heated air rises through the apertures in the screen plate and along its periphery and descends along the cylinder wall when cooled, being then reheated and returned, or replaced by draft from below, if open around base.

I claim:

1. A cooking utensil having a container vessel, supporting means for said container vessel forming in combination therewith an air well about said container, normally closed at top and sides, means for admitting heated air to said well and shielding said container from flame contact, and cooker enclosed thermostat means actuated by said heated air in the air well for venting superheated air from said well.

2. A cooking utensil having a container vessel, supporting means for said container vessel forming in combination therewith an air well about said container, means for admitting heated air to said well and shielding said container from flame contact, and thermostat means contained in the cooking utensil and actuated by heated air in the air well, for venting air from said well.

3. A cooking utensil having a container vessel, supporting means for said container vessel forming in combination therewith an air chamber about said container, means for admitting heated air to said chamber and shielding said container from flame contact, and thermostat means within said air chamber and actuated by heated air therein, for venting superheated air from said chamber.

4. In a cooking utensil, a container vessel, supporting means for said container vessel forming in combination therewith an air chamber about said container, means for heating the air in said chamber and shielding said container from flame contact, and means within said air chamber and actuated by heated air therein, for venting superheated air therefrom.

5. In a cooking utensil, a container vessel, supporting means for said container vessel forming in combination therewith an air chamber about said container, means for heating the air in said chamber and shielding said container from flame contact, and means within said air chamber and actuated by heated air therein to open an air vent.

6. In a cooking utensil, a container vessel, supporting means for said container vessel forming in combination therewith an air chamber about said container, means for heating said container by heated air in said chamber, means for heating said air and shielding said container from flame contact, and means within said air chamber and actuated by heated air therein to vent superheated air therefrom.

7. In a cooking utensil, a container vessel, supporting means for said container vessel forming in combination therewith an air chamber about said container, an air vent in said container, means for normally closing said air vent, means for heating said container by heated air in said chamber, means for heating said air and shielding the container from flame contact, and means within the air chamber and actuated by heated air therein to open said air vent.

ROBERT EDWIN REARDON.